United States Patent
Hunzinger et al.

(10) Patent No.: US 6,501,947 B1
(45) Date of Patent: Dec. 31, 2002

(54) EFFICIENT RESOURCE MANAGEMENT FOR PACKET DATA SERVICES

(75) Inventors: Jason F. Hunzinger, Carlsbad, CA (US); Mark W. Cheng, San Diego, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/471,963

(22) Filed: Dec. 23, 1999

(51) Int. Cl.[7] .............................................. H04M 3/42
(52) U.S. Cl. .................... 455/414; 455/560; 379/209.01
(58) Field of Search .................. 455/422, 424, 455/425, 426, 432, 433, 434, 435, 436, 445, 447, 448, 450, 452, 463, 503, 509, 510, 512, 513, 517, 438, 455; 370/329; 379/138, 207.02, 207.03, 207.01, 210.01

(56) References Cited

U.S. PATENT DOCUMENTS

| | | | |
|---|---|---|---|
| 5,274,837 A | * 12/1993 | Cildress et al. .............. 455/510 |
| 5,276,911 A | * 1/1994 | Levine ........................ 455/510 |
| 5,287,545 A | * 2/1994 | Kallin ......................... 455/510 |
| 5,355,516 A | * 10/1994 | Herold et al. ................ 455/450 |
| 5,483,670 A | * 1/1996 | Childress et al. |
| 5,657,358 A | * 8/1997 | Panech et al. .............. 375/356 |
| 5,740,533 A | * 4/1998 | Lin ............................. 455/432 |
| 5,752,193 A | * 5/1998 | Scholefield et al. ........ 455/452 |
| 5,790,606 A | * 8/1998 | Dent .......................... 375/348 |
| 5,943,334 A | * 8/1999 | Buskens et al. ............ 370/350 |
| 6,052,578 A | * 4/2000 | McWeeny et al. .......... 455/510 |
| 6,052,584 A | * 4/2000 | Harvey et al. .............. 455/423 |
| 6,058,307 A |   5/2000 | Garner |

* cited by examiner

*Primary Examiner*—Edward F. Urban
*Assistant Examiner*—Charles Craver
(74) *Attorney, Agent, or Firm*—Harness, Dickey & Pierce, PLC

(57) ABSTRACT

The present invention is a system for distributing the reconnection attempts of multiple system users in a CDMA telephone system over a broad time window. The present invention allows either the base station or the mobile station to process data to determine an appropriate reconnect time. The data may include resource capability, priority, client connects pending, and timing and amount of data on pending connection requests. Using this data information, a more efficient reconnection scheme may be developed. The number of requests required to successfully connect can be reduced while increasing the utilization of resources and reducing the delay until connection. Under an intelligent reconnection scheme, the probability of system users attempting simultaneous reconnection is reduced, thus reducing the likelihood of reconnection collision.

8 Claims, 3 Drawing Sheets

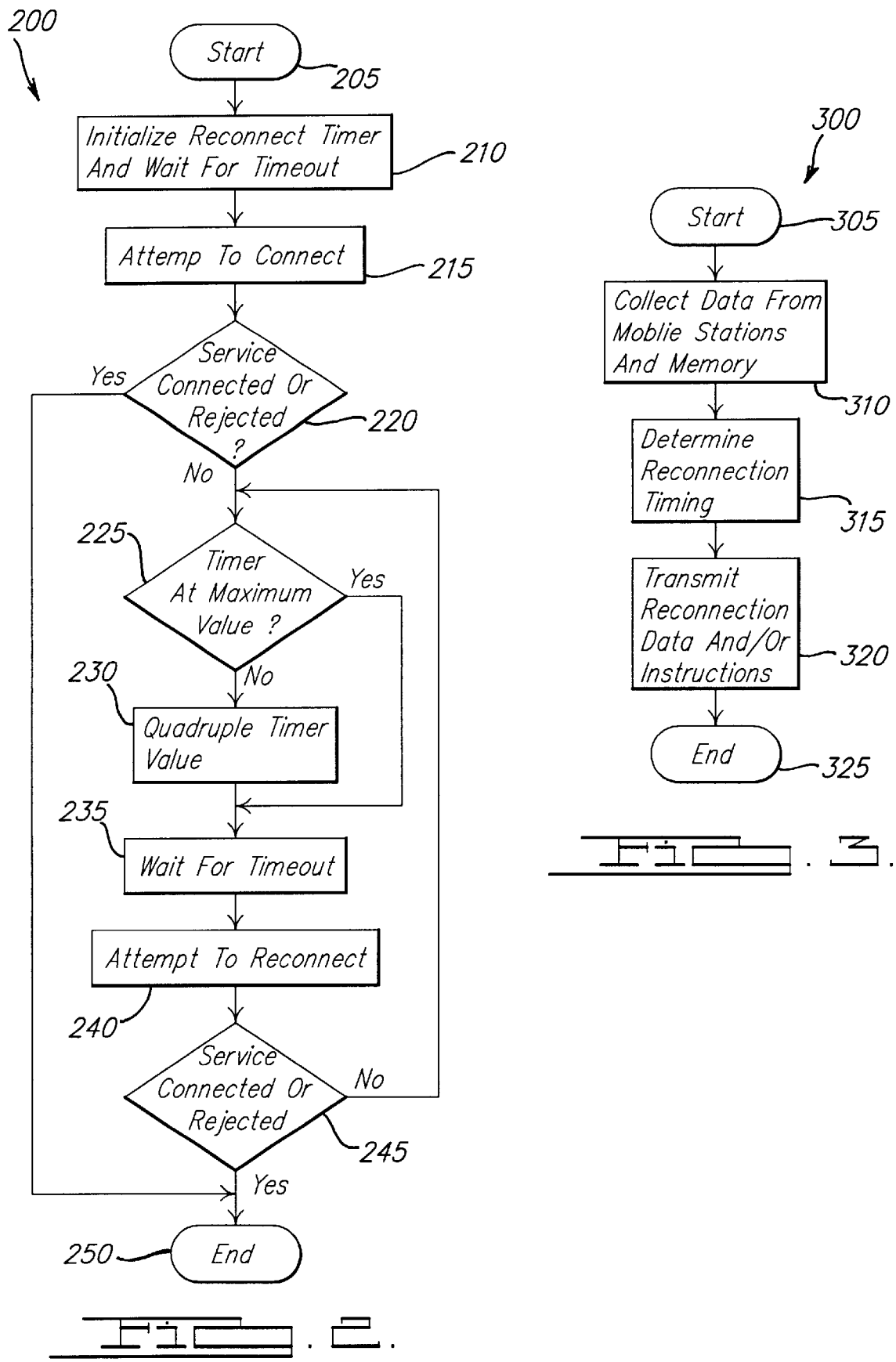

EFFICIENT RESOURCE MANAGEMENT FOR PACKET DATA SERVICES

BACKGROUND OF THE INVENTION

The use of wireless communication systems is growing with users now numbering well into the millions. One of the popular wireless communications systems is the cellular telephone, having a mobile station (or handset) and a base station. Cellular telephones allow a user to talk over the telephone without having to remain in a fixed location. This allows users to, for example, move freely about the community while talking on the phone.

Cellular telephones may operate under a variety of standards including the code division multiple access (CDMA) cellular telephone communication system as described in TIA/EIA, IS-95, Mobile station-Base Station Compatibility Standard for Dual-Mode Wideband Spread Spectrum Cellular System, published July 1993. CDMA is a technique for spread-spectrum multiple-access digital communications that creates channels through the use of unique code sequences. In CDMA systems, signals can be and are received in the presence of high levels of interference. The practical limit of signal reception depends on the channel conditions, but CDMA reception in the system described in the aforementioned IS-95 Standard can take place in the presence of interference that is 18 dB larger than the signal for a static channel. Typically the system operates with a lower level of interference and dynamic channel conditions.

A CDMA base station communicates with a mobile station with a signal having a basic data rate of 9600 bits/s. The signal is then spread to a transmitted bit rate, or chip rate, of 1.2288 MHz. Spreading applies digital codes to the data bits, which increase the data rate while adding redundancy to the CDMA system. The chips of all the users in that cell are then added to form a composite digital signal. The composite digital signal is then transmitted using a form of quadrature phase shift keying (QPSK) modulation that has been filtered to limit the bandwidth of the signal.

In a code division multiple access (CDMA) spread spectrum communication system, a common frequency band is used for communication with all base stations within that system. If two or more mobile users simultaneously contend for an idle packet-data channel in a system using IS-707, the system will only allow one access to the channel. Mobile users unsuccessful at accessing the channel must repeat the transmission of the data packet until it is accepted by the system. The system users transmitting data packets to mobile users also contend for the downlink by being placed in a queue.

Under the current IS-707 standard, when a system user is unable to access the channel, the system user reattempts connection after a predetermined wait. The length of the wait is defined by the IS-707 standard, and is the same for each system user. After each subsequent unsuccessful attempt to connect to the system, the length of the wait is increased until a maximum value is reached. However, if the system users were denied access to an idle channel because multiple users attempted to simultaneously access the channel, each user will attempt to re-access the channel at the same time, causing further collisions.

What is needed is a system that allows the system users to wait for a free channel to connect to the system while reducing the probability of reconnection collision with other system users.

SUMMARY OF THE INVENTION

The present invention is a system for distributing the reconnection attempts of multiple system users in a CDMA telephone system over a broad time window. The present invention allows either the base station or the mobile station to process data to determine an appropriate reconnect time. The data may include resource capability, priority, client connects pending, and timing and amount of data on pending connection requests. Using this data information, a more efficient reconnection scheme may be developed. Under an intelligent reconnection scheme, the probability of system users attempting simultaneous reconnection is reduced, thus reducing the likelihood of reconnection collision.

One aspect of the invention is a method of determining the length of time between connection requests in a wireless communication system. The method comprises collecting data regarding connection requests and calculating reconnection timing for each connection request based on the collected data. The method may further comprise transmitting the collected data or a subset thereof to a mobile station. The collected data comprises, among other things, an amount an distribution of connection requests, a number of available resources, an expected duration of a connection, an expected duration of current connections, a priority indicator of the connection requests, and an expected number of new connection requests.

Another aspect of the present invention is a timer setting circuit for use in a mobile communication system. The timer setting circuit comprises a reconnection timer and a timer setting circuit. The timer setting circuit sets the reconnection timer to a value after a failed connection attempt between a mobile station and the mobile communication system. The timer setting circuit determines the value of the reconnection timer is based on a set of data regarding connection requests.

Another aspect of the invention is a method of intelligently managing the reconnection timing in a wireless communication system. The method comprises determining a number of available resources and estimating an expected release time of unavailable resources. The method further comprises determining the number of refused connection attempts and calculating a reconnection timing for each of the refused connection attempts based on the number of available resources and the expected release time of unavailable resources. The method further comprises establishing a priority of each of the refused connection attempts and adjusting the reconnection timing for each of the refused connection attempts based on the priority.

Another aspect of the invention is a mobile communication system comprising a transceiver and a reconnection control device. The reconnection control device determines the timing of a connection attempt between a mobile station and the mobile communication system. The reconnection control device determines the timing based on a set of data regarding connection requests. The set of data may include, among other things, an-amount of connection requests, a number of available resources, an expected duration of a connection, an expected duration of the current connections, a priority indicator of the connection requests, and the expected new connection requests. The reconnection control device may be located within a base station or a mobile station.

Another aspect of the invention is a mobile communication system in which the base station can efficiently manage contention of a common access resource. The access resource is shared and is not dedicated to a particular mobile station. Therefore, even if multiple traffic channels are free, the mobile stations are not requesting the resources at the same time.

BRIEF DESCRIPTION OF THE DRAWINGS

These and other features and advantages of the invention will become more apparent upon reading the following detailed description and upon reference to the accompanying drawings.

FIG. 2 is a flowchart illustrating the reconnection timer procedure according to the existing standard.

FIG. 3 is a flowchart illustrating the base station procedure according to the present invention.

DESCRIPTION OF THE PREFERRED EMBODIMENTS

Figure 1:
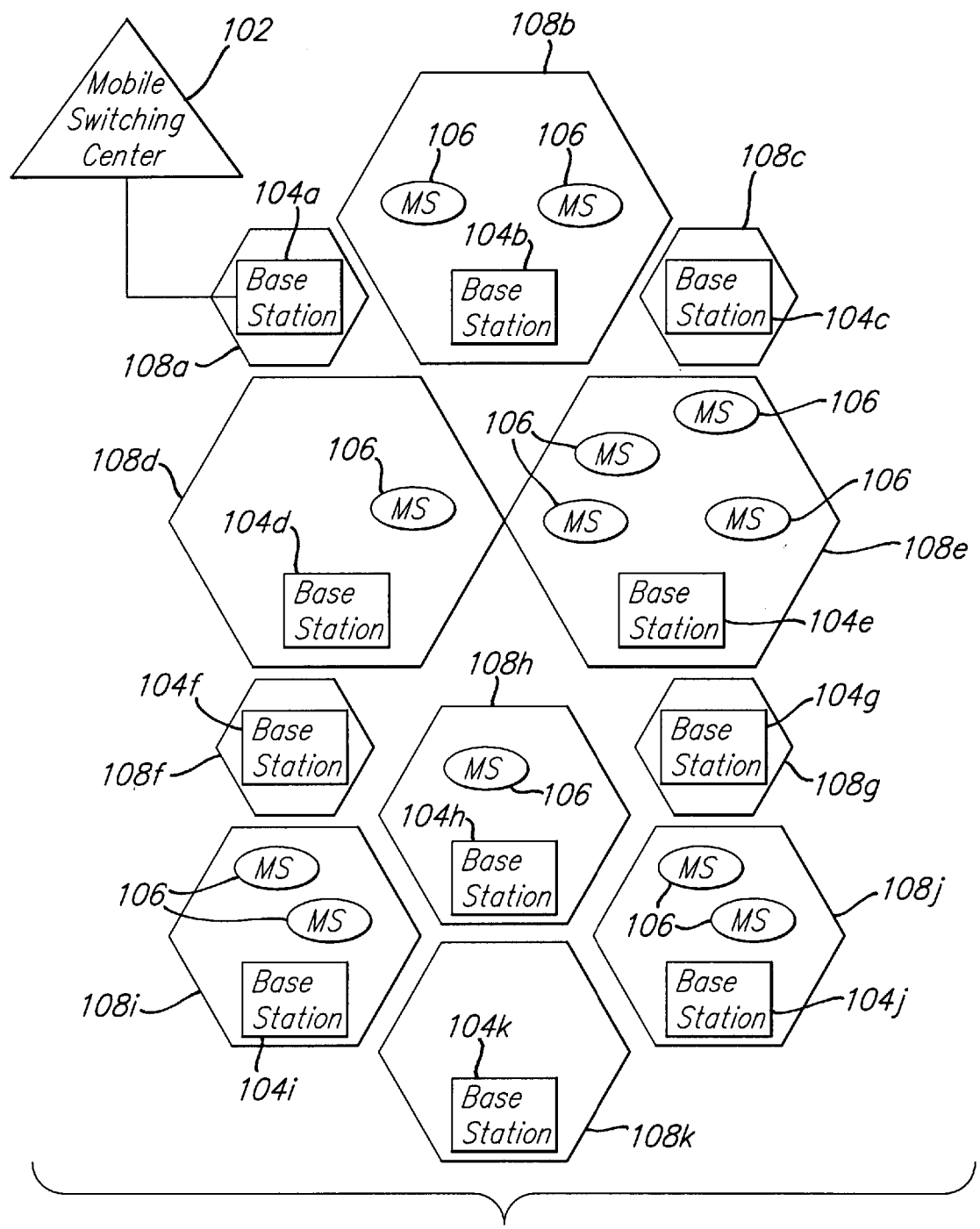
FIG. 1 illustrates the components of an exemplary wireless communication system used by the present invention.

FIG. 1 illustrates components of an exemplary wireless communication system. A mobile switching center 102 communicates with base stations 104a–104k (only one connection shown). The base stations 104a–104k (generally 104) broadcasts data to and receives data from mobile stations 106 within cells 108a–108k (generally 108). The cell 108 is a geographic region, roughly hexagonal, having a radius of up to 35 kilometers or possibly more.

A mobile station 106 is capable of receiving data from and transmitting data to a base station 104. In one embodiment, the mobile station 106 receives and transmits data according to the Code Division Multiple Access (CDMA) standard. CDMA is a communication standard permitting mobile users of wireless communication devices to exchange data over a telephone system wherein radio signals carry data to and from the wireless devices.

Under the CDMA standard, additional cells 108a, 108c, 108d, and 108e adjacent to the cell 108b permit mobile stations 106 to cross cell boundaries without interrupting communications. This is so because base stations 104a, 104c, 104d, and 104e in adjacent cells assume the task of transmitting and receiving data for the mobile stations 106. The mobile switching center 102 coordinates all communication to and from mobile stations 106 in a multi-cell region. Thus, the mobile switching center 102 may communicate with many base stations 104.

Mobile stations 106 may move about freely within the cell 108 while communicating either voice or data. Mobile stations 106 not in active communication with other telephone system users may, nevertheless, scan base station 104 transmissions in the cell 108 to detect any telephone calls or paging messages directed to the mobile station 106.

One example of such a mobile station 106 is a cellular telephone used by a pedestrian who, expecting a telephone call, powers on the cellular telephone while walking in the cell 108. The cellular telephone scans certain frequencies (frequencies known to be used by CDMA) to synchronize communication with the base station 104. The cellular telephone then registers with the mobile switching center 102 to make itself known as an active user within the CDMA network.

When detecting a call, the cellular telephone scans data frames broadcast by the base station 104 to detect any telephone calls or paging messages directed to the cellular telephone. In this call detection mode, the cellular telephone receives, stores and examines paging message data, and determines whether the data contains a mobile station identifier matching an identifier of the cellular telephone. If a match is detected, the cellular telephone establishes a call with the mobile switching center 102 via the base station 104. If no match is detected, the cellular telephone enters an idle state for a predetermined period of time, then exits the idle state to receive another transmission of paging message data.

When attempting to place a call, the mobile station 106 sends a connection request to the base station 104. If a traffic channel is available, the mobile station 106 connects to the base station and transmits the call information along the traffic channel. However, if no traffic channel is available, the mobile station 106 waits a predetermined amount of time and then attempts to reconnect.

FIG. 2 illustrates the process 200 used by a mobile station 106 under the current CDMA standard after an initial attempt to connect has failed. The process 200 begins at a start state 205. Proceeding to state 210, the mobile station 106 initializes a reconnect timer and waits for the time out. Under the IS-707 standard, the timer is initialized at approximately four seconds. After the timer has elapsed, the process 200 proceeds to state 215 and again attempts to connect to the base station 104.

Proceeding to state 220, the mobile station 106 determines whether service with the base station 104 has been connected or rejected, or if the mobile station 106 was unable to communicate with the base station 104. If the connection with the base station 104 is successful, the mobile station 106 proceeds along the YES branch and the connection process terminates in end state 250. Returning to state 220, if the connection with the base station 104 is unsuccessful, the mobile station 106 proceeds along the NO branch to state 225 where the mobile station 106 determines whether the timer is at the maximum allowable value.

If the timer is at the maximum value, the mobile station 106 proceeds along the YES branch to state 235, where the mobile station waits for the timer to time out. Returning to state 220, if the time is not at the maximum value, the mobile station 106 proceeds along the NO branch to state 230, where the value of the time is quadrupled. After quadrupling the timer value, the mobile station proceeds to state 235 to wait for the timer to time out.

After the timer expires in state 235, the mobile station 106 proceeds to state 240 and attempts to reconnect to the base station 104. If the connection with the base station 104 is successful, the mobile station 106 proceeds along the YES branch and the connection process terminates in end state 250. Returning to state 245, if the connection with the base station 104 is unsuccessful, the mobile station 106 proceeds along the NO branch to state 225 where the mobile station 106 again determines whether the timer is at the maximum allowable value. Every time the mobile station 106 unsuccessfully attempts connection with the base station 104, the mobile station 106 quadruples the wait timer until a maximum value is met. After time out of the wait timer, the mobile station reattempts connection with the base station 104.

An example of a series of mobile stations 106 attempting to communicate with the base station 104 according to the existing IS-95 standard will now be described. One scenario in which reconnection collision is likely is when multiple mobile stations 106 attempt to communicate with the base station at approximately the same time. This may occur, for example, after the base station 104 broadcasts an alert message to all the mobile stations 106. Other examples may be when the mobile stations 106 are programmed to communicate with the base station 104 at a predetermined time or after a predetermined event. For example, if ten mobile stations 106 simultaneously attempt to connect to one available channel of the base station 104, only one of the mobile stations 106 can successfully connect. The other nine mobile stations 106 then initialize their respective reconnection timers at four seconds. Because each of the mobile stations 106 initialize the reconnection timers at approximately the same time, the timers will time out at approximately the same time. Thus, all nine of the mobile stations 106 attempt to reconnect at the same time, causing further reconnection collision. At this time, the mobile stations 106 quadruple the value of the reconnection timers. However, because each timer is set for four seconds, after quadrupling, each timer is set for sixteen seconds. Once again, the reconnection timers time out at approximately the same time and all of the mobile stations 106 again attempt to reconnect at the same time. This process repeats and the reconnection timer value quadruples to 64 seconds. However, time out of each of the mobile stations 106 occurs at the same time, and the mobile stations 106 again attempt to simultaneously reconnect to the base station 104, thereby causing further reconnection collision. Meanwhile, during the 64 seconds the timer is counting, it is possible the base station 104 is available. This process repeats, quadrupling the reconnection timer until a maximum value is reached (approximately 4096 seconds) and until all the mobile stations 106 eventually communicate with the base station 104.

The present invention attempts to reduce the reconnection collision rate and unsuccessful reconnection attempts by intelligently assigning reconnection times to the mobile stations 106. Rather than simply incrementing a set value as in the current standard, the present invention processes data relevant to the connection process and determines a reconnection time for each mobile station 106 based on that data. According to the present invention, when insufficient resources are available to support all the mobile station 106 connection requests, the base station 104 collects data on resource capability, client connects pending, timing and amount of data on pending and active connects, or any other factor that may influence reconnect collision or resource contention. The base station 104 may either transmit this data to each mobile station 106 or use the data to calculate a reconnection time for each mobile station 106. If the mobile station 106 receives the data, the mobile station 106 may use the data to calculate a new reconnection time.

FIG. 3 illustrates a process 300 used by a base station 104 under the present invention after an initial attempt to connect has failed. The process 300 begins at a start state 305. Proceeding to state 310, the base station 104 collects data from the mobile stations 106 and the memory of the base station 104. As stated above, this data may include resource capability, client connects pending, timing and amount of data on pending and active connects, or any other factor that may influence reconnect collision. Typically, the base station 104 has knowledge of the resource capacity, the active connections, and the recent connection requests. The base station may collect additional information from each mobile station 106 such as the expected duration of the connection and the priority of the request.

Proceeding to state 315, the base station 104 processes the data and determines an appropriate reconnection timing pattern for each mobile station 106. In determining the reconnection timings, the base station 104 balances, among other factors, the contention on the resource used to request connections, the contention of requests for packet data service resources, the probability of idle packet data service resources when mobile stations 106 are waiting to connect, and varying quality of service requirements by the mobile stations 106 (for example, a mobile station 106 transmitting data may require a different quality connection than a mobile station 106 transmitting only voice communications). By balancing the multiple factors, the base station 104 assigns reconnection times to each of the mobile stations 106.

Proceeding to state 320, the base station 104 transmits the reconnection data and/or the reconnection timing instructions to the mobile stations 106. If only the reconnection timing instructions are transmitted, the mobile stations 106 are assigned a new reconnection time. If only the reconnection data is transmitted, the mobile stations 106 can calculate their own reconnection times based on the data. If both the reconnection timing instructions and the reconnection data are transmitted, the mobile station 106 may either accept the base station 104 recommendation for reconnection timing or calculate a new reconnection time. The process 300 then terminates in end state 325.

Figure 4:
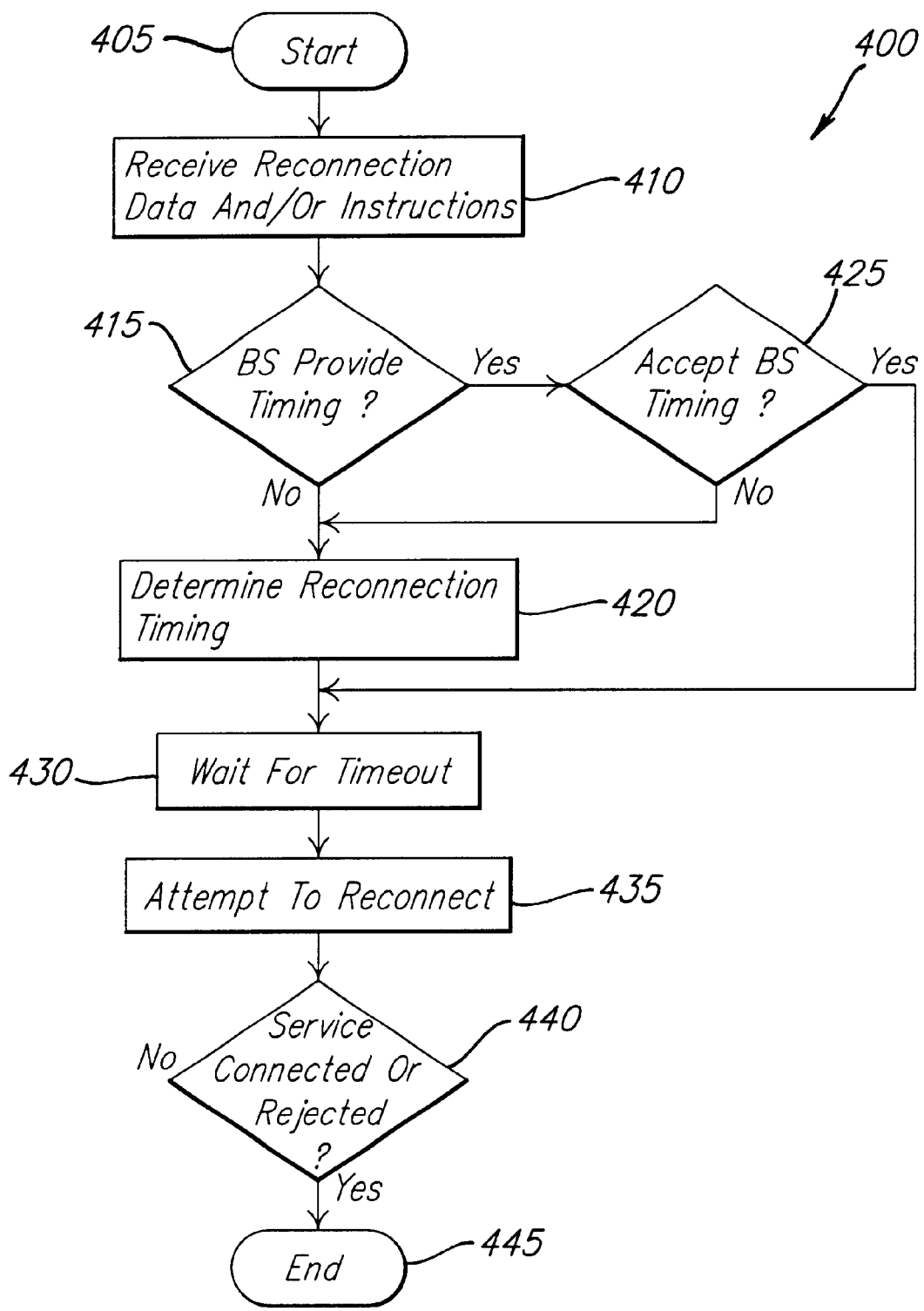
FIG. 4 is a flowchart illustrating the mobile station procedure according to the present invention.

FIG. 4 illustrates a process 400 used by a mobile station 106 under the present invention after an initial attempt to connect to the base station 104 has failed. The process 400 begins at a start state 405. Proceeding to state 410, the mobile station 106 receives the reconnection data and/or the reconnection timing instructions from the base station 104. Proceeding to state 415, the mobile station determines if the base station 104 provided suggested reconnection timing instructions. As stated above, the base station 104 may calculate desired reconnection timing instructions from the reconnection timing data, or may simply send the reconnection timing data to the mobile stations.

If the base station 104 provided reconnection timing instructions, the process 400 proceeds along the YES branch to state 425 and determines whether to accept the timing instructions. The mobile station 106 may either accept the timing instructions from the base station or may reject the instructions. In an alternative embodiment of the invention, the mobile station 106 may be required to accept the instructions of the base station 104. If the mobile station 106 accepts the timing instructions from the base station 104, then the process 400 proceeds along the YES branch to state 430. Returning to state 425, if the mobile station rejects the timing instructions from the base station 104, the process 400 proceeds along the NO branch to state 420. Returning to state 415, if the base station 415 did not provide timing instructions, the process 400 proceeds along the NO branch to state 420.

In state 420, the mobile station 106 processes the reconnection data provided by the base station 104 and determines an appropriate reconnection timing pattern. In determining the reconnection timings, the mobile station 106 balances, among other factors, the recommended wait time if provided, the number of mobile stations refused since the last granted connection, the ratio of client requested resources that were refused, or use of a delay indicator that is an index into a delay timeout table. The delay timeout table can be predefined, downloaded, or updated by the base station 104. The delay indicator can also indicate the expected rate or duration when a resource is available. By balancing the multiple factors, the mobile station 106 can select an appropriate reconnection time. After the reconnection time is established, the process 400 proceeds to state 430.

In state 430, the mobile station 106 waits for the reconnection timer to time out or for the specific reconnection time to be reached. After the timer has elapsed, the process 400 proceeds to state 435 and again attempts to connect to the base station 104.

Proceeding to state 440, the mobile station 106 determines whether service with the base station 104 has been connected or rejected, or if the mobile station 106 was unable to connect with the base station 104. If the connection with the base station 104 is successful, the mobile station 106 proceeds along the YES branch and the connection process terminates in end state 445. Returning to state 440, if the connection with the base station 104 is unsuccessful, the mobile station 106 proceeds along the NO branch to state 415 where the mobile station 106 repeats the process of obtaining a new reconnection time until successfully connected to the base station 104.

When determining the reconnection timing, a base station 104 may process data including the mobile station 106 identifier, the time of the first resource request ($t_o$), the time of the most recent resource request ($t_r$), the most recent reconnect indication that the base station 104 sent to the mobile station 106 ($T_i$), the time of assignment of a resource ($t_a$), and the expected duration of an assignment of a resource ($T_d$). If the mobile station 106 is pending on the resource, then the expected assignment of the resource is at the next reconnect attempt ($t_a = t_r + T_i$). Otherwise, the time of assignment $t_a$ is known. Therefore, the base station 104 can compute an expected completion time ($t_c = t_a + T_d$). If all of the resources are in use, the base station 104 can compute an expected time until a resource is expected to be free ($t_m$=min ($t_c$−t), where t is the current time). The base station 104 may also assign a reconnect time to a mobile station 106 expecting a resource to be free at a particular time. If the resource becomes available early, the base station 104 may reject any intervening requests for that resource to favor the assigned mobile station 106.

An example of the present invention is a scenario in a cdma2000 system where many mobile stations 106 need to use the limited resources of a base station 104. The base station 104 can determine the loading on the paging channels, the access channels, and any supplemental channels. The base station 104 can also approximate how long each mobile station 106 may remain connected. The base station 104 uses this information to determine the earliest expected time that a mobile station 106 could be reconnected and may assign a reconnection time as appropriate. For example, a base station 104 may have no available resources but expects that a single resource will become available in approximately 30 seconds while the other resources are expected to be in use for a longer period of time. If a first mobile station 106 requests a connection for 60 seconds and a second mobile station 106 requests a connection after the first mobile station 106. The base station 104 may send a reconnection indication of 1 second to the first mobile station 106 and a reconnection indication of 61 seconds to the second mobile station 106. Therefore, the second mobile station 106 would attempt to reconnect after the first mobile station 106 is expected to be finished with the resource.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of determining the length of time between connection requests in a wireless communication system comprising:

collecting data regarding connection requests; and calculating reconnection timing for each connection request based on the collected data;

wherein the collected data comprises an amount of connection requests, a number of available resources, and an expected duration of a connection.

2. A timer setting circuit for use in a mobile communication system comprising:

a reconnection timer; and a timer setting circuit which sets the reconnection timer to a value after a failed connection attempt between a mobile station and the mobile communication system, wherein the timer setting circuit determines the value of the reconnection timer based on a set of data regarding connection requests, wherein the set of data comprises an amount of connection requests, a number of available resources, and an expected duration of a connection.

3. A method of intelligently managing the reconnection timing in a wireless communication system comprising:

determining a number of available resources;

estimating an expected release time of unavailable resources;

determining the number of refused connection attempts; and calculating a reconnection timing for each of the refused connection attempts based on the number of available resources and the expected release time of unavailable resources.

4. The method of claim 3, further comprising establishing a priority of each of the refused connection attempts.

5. The method of claim 4, further comprising adjusting the reconnection timing for each of the refused connection attempts based on the priority.

6. The method of claim 3, further comprising estimating the anticipated duration of the refused connection attempts.

7. The method of claim 6, further comprising adjusting the reconnection timing for each of the refused connection attempts based on the anticipated duration of the refused connection attempts.

8. A mobile communication system comprising:

a transceiver; and a reconnection control device which determines a timing of a connection attempt between a mobile station and the mobile communication system, wherein the reconnection control device determines the timing based on a set of data regarding connection requests, wherein the set of data comprises an amount of connection requests, a number of available resources, and an expected duration of a connection.

* * * * *